US012595833B2

(12) United States Patent
Yasui

(10) Patent No.: US 12,595,833 B2
(45) Date of Patent: Apr. 7, 2026

(54) SHOCK ABSORBER

(71) Applicant: KYB CORPORATION, Tokyo (JP)

(72) Inventor: Takeshi Yasui, Tokyo (JP)

(73) Assignee: KYB Corporation, Tokyo (JP)

( * ) Notice: Subject to any disclaimer, the term of this patent is extended or adjusted under 35 U.S.C. 154(b) by 752 days.

(21) Appl. No.: 17/630,783

(22) PCT Filed: Sep. 17, 2020

(86) PCT No.: PCT/JP2020/035183
§ 371 (c)(1),
(2) Date: Jan. 27, 2022

(87) PCT Pub. No.: WO2021/084956
PCT Pub. Date: May 6, 2021

(65) Prior Publication Data
US 2022/0268335 A1 Aug. 25, 2022

(30) Foreign Application Priority Data

Oct. 30, 2019 (JP) ................................. 2019-196923

(51) Int. Cl.
*F16F 9/34* (2006.01)
*F16F 9/06* (2006.01)
*F16F 9/348* (2006.01)
(52) U.S. Cl.
CPC ............ *F16F 9/3484* (2013.01); *F16F 9/061* (2013.01)
(58) Field of Classification Search
CPC ........ F16F 9/061; F16F 9/3214; F16F 9/3405; F16F 9/348; F16F 9/3484; F16F 9/3487
(Continued)

(56) References Cited

U.S. PATENT DOCUMENTS 2,711,797 A * 6/1955 Muller ..................... B62D 5/12
91/401
3,365,033 A * 1/1968 Herbert ................... F16F 9/465
188/282.5
(Continued)

FOREIGN PATENT DOCUMENTS

DE 19729289 A1 * 1/1999 ............ F16F 9/3487
DE 101 26 555 A1 1/2002
(Continued)

OTHER PUBLICATIONS

Nov. 15, 2022, Japanese Office Action issued for related JP Application No. 2021-554164.
(Continued)

*Primary Examiner* — Thomas J Williams
(74) *Attorney, Agent, or Firm* — Paratus Law Group, PLLC

(57) ABSTRACT

A shock absorber according to the present invention includes: a cylinder; a rod movably inserted into the cylinder; an extension side chamber (operation chamber) and a compression side chamber (operation chamber) provided in the cylinder; a valve disc that is provided to be movable in the axial direction on the outer circumference of the rod and has an annular valve seat and a port which is opened on the inner circumference of the annular valve seat and causes the extension side chamber (operation chamber) and the compression side chamber (operation chamber) to communicate with each other; and an annular leaf valve that opens and closes the port.

20 Claims, 5 Drawing Sheets

(58) Field of Classification Search
USPC .................................... 188/322.15, 322.22
See application file for complete search history.

(56) References Cited

U.S. PATENT DOCUMENTS

| | | | | | |
|---|---|---|---|---|---|
| 4,096,928 | A | * | 6/1978 | Krafzig | B60R 19/32 |
| | | | | | 188/282.5 |
| 4,503,951 | A | * | 3/1985 | Imaizumi | F16F 9/516 |
| | | | | | 267/64.15 |
| 4,515,252 | A | * | 5/1985 | Hidaka | F16F 9/344 |
| | | | | | 188/315 |
| 2002/0000352 | A1 | | 1/2002 | Matsumoto et al. | |
| 2002/0027051 | A1 | | 3/2002 | Grundei | |
| 2004/0251099 | A1 | * | 12/2004 | Papp | F16F 9/3485 |
| | | | | | 188/322.15 |
| 2009/0084647 | A1 | | 4/2009 | Maneyama et al. | |
| 2011/0290604 | A1 | * | 12/2011 | Six | F16F 9/348 |
| | | | | | 188/322.15 |
| 2012/0234639 | A1 | | 9/2012 | Teraoka et al. | |
| 2015/0198214 | A1 | | 7/2015 | Mizuno | |
| 2017/0307044 | A1 | | 10/2017 | Yamashita et al. | |
| 2022/0268335 | A1 | * | 8/2022 | Yasui | F16F 9/061 |

FOREIGN PATENT DOCUMENTS

| | | | |
|---|---|---|---|
| DE | 10 2008 014 661 | A1 | 4/2009 |
| DE | 11 2015 004 940 | T5 | 7/2017 |
| GB | 1512884 | A | * 6/1978 | ............. F16F 9/348 |
| GB | 1550815 | A | * 8/1979 | ............. F16F 9/348 |
| JP | 55027516 | A | * 2/1980 | ............. F16F 9/348 |
| JP | 55163344 | A | * 12/1980 | ............. F16F 9/348 |
| JP | 56020846 | A | * 2/1981 | ............. F16F 9/348 |
| JP | 56116940 | A | * 9/1981 | ............. F16F 9/348 |
| JP | H02-098234 | U | 8/1990 | |
| JP | H05-126198 | A | 5/1993 | |
| JP | H11-280819 | A | 10/1999 | |
| JP | 2002-106624 | A | 4/2002 | |
| JP | 2007-211909 | A | 8/2007 | |
| JP | 2011-122676 | A | 6/2011 | |
| JP | 2013-096474 | A | 5/2013 | |
| KR | 20120083622 | A | * 7/2012 | ............. F16F 9/3214 |

OTHER PUBLICATIONS

May 2, 2023, Japanese Office Action issued for related JP Application No. 2021-554164.
Jun. 1, 2023, Chinese Office Action issued for related CN Application No. 202080073732.7.
May 23, 2025, German Office Action issued for related DE Application No. 112020005357.1.

* cited by examiner

SHOCK ABSORBER

CROSS REFERENCE TO PRIOR APPLICATION

This application is a National Stage Patent Application of PCT International Patent Application No. PCT/JP2020/035183 (filed on Sep. 17, 2020) under 35 U.S.C. § 371, which claims priority to Japanese Patent Application No. 2019-196923 (filed on Oct. 30, 2019), which are all hereby incorporated by reference in their entirety.

TECHNICAL FIELD

The present invention relates to a shock absorber.

BACKGROUND ART

A shock absorber is interposed, for example, between a vehicle body and wheels of the vehicle to exert a damping force and suppress vibration of the vehicle body and the wheels. The damping force exerted by the shock absorber is exerted by a damping valve and affects ride comfort in the vehicle. In recent years, there is a demand for exertion of the damping force in the shock absorber used for a suspension of the vehicle even when expanding or contracting at a very low speed in order to improve the ride comfort.

In order to meet such a demand, the shock absorber includes a back pressure leaf valve that exerts a damping force when expanding or contracting at an extremely low speed in addition to a main valve provided in a piston in some cases.

The main valve has a structure in which a leaf valve that opens and closes a port provided in the piston and an orifice are arrayed in parallel, and the leaf valve does not open and only the orifice exerts a damping force when the extension or contraction speed of the shock absorber is extremely low. Meanwhile, the orifice has a characteristic of exerting the damping force in proportion to the square of a flow rate, and hardly exerts the damping force when the extension or contraction speed of the shock absorber is extremely low and the flow rate is very small. Thus, it is difficult to exert the damping force when the shock absorber expands or contracts at an extremely low speed only with the main valve.

On the other hand, the back pressure leaf valve is annular, is double swing type with an outer circumference supported by an annular seat portion of a cap assembled to the piston and an inner circumference supported by an annular seat portion of a piston nut, and is arranged in series with the main valve. Further, the back pressure leaf valve is deflected to open when the shock absorber expands or contracts at an extremely low speed to exert a damping force. The shock absorber configured in this manner includes the back pressure leaf valve that exerts the damping force when expanding or contracting at an extremely low speed, in addition to the main valve that exerts the damping force when expanding or contracting at a speed equal to or higher than a low speed, and thus, can exert the damping force even when expanding or contracting at an extremely low speed and improve the ride comfort in the vehicle.

CITATION LIST

Patent Literature

Patent Literature 1: JP H5-126198 A

SUMMARY OF INVENTION

Technical Problem

Although the damping force can be exerted even when the shock absorber expands or contracts at an extremely low speed in the conventional shock absorber in this manner, the leaf valve repeats opening and closing at the same frequency in response to input of vibration in a resonance frequency band of an unsprung member of the vehicle. The back pressure leaf valve is deflected to separate from the seat portion and open, and then, returns to a valve closing position of seating on the seat portion by a restoring force due to its own elasticity, and thus, repeatedly collides with the seat portion of the cap or the piston nut.

The cap and the piston nut are fixed to a piston rod, and an impact due to a collision with the seat portion of the back pressure leaf valve is transmitted to the vehicle body of the vehicle through the piston rod and is perceived as rattling noise by a passenger in a vehicle compartment, thereby giving discomfort to the passenger.

Therefore, an object of the present invention is to provide a shock absorber capable of eliminating rattling noise and improving ride comfort in a vehicle.

Solution to Problem

In order to solve the above problems, a shock absorber according to the present invention includes: a cylinder; a rod movably inserted into the cylinder; two operation chambers provided in the cylinder; a valve disc that is provided to be movable in an axial direction on an outer circumference of the rod and has an annular valve seat and a port which is opened on an inner circumference of the annular valve seat and causes the two operation chambers to communicate with each other; and an annular leaf valve that opens and closes the port.

In the shock absorber configured in this manner, the valve disc can move in the axial direction with respect to the rod, and thus, it is possible to suppress transmission of an impact, generated when the leaf valve is seated from a state of being separated from the annular valve seat, to the rod and to suppress application of vibration to a vehicle body.

In addition, the shock absorber may also be configured to bias the valve disc to be separated in the axial direction in a state where the leaf valve is seated on the annular valve seat. According to the shock absorber configured in this manner, a damping force as set can be exerted even when the shock absorber expands or contracts at an extremely low speed, and there is no possibility that the damping force becomes insufficient to degrade the ride comfort.

Furthermore, the leaf valve in the shock absorber may be configured as a leaf valve that is annular and of a double swing type. According to the shock absorber configured in this manner, the damping force on both extension and contraction sides can be exerted by the single leaf valve, the total length of the piston portion can be shortened, and accordingly, the stroke length of the shock absorber can be easily ensured.

Further, the shock absorber may include an annular valve adjustment shim that is mounted on the outer circumference of the rod, faces the valve disc with a gap in the axial direction, and is arranged on an inner circumferential side of the leaf valve. According to the shock absorber configured in this manner, the valve adjustment shim functions not only for adjustment of the amount of initial deflection applied to the leaf valve but also as a stopper for restricting the movement of the valve disc, and thus, the two functions can be integrated into the valve adjustment shim, and the number of parts can be reduced to lower the cost.

The shock absorber may further include: an annular valve adjustment shim that is mounted on the outer circumference of the rod, faces the valve disc with a gap in the axial direction, and is arranged on the leaf valve on a side close to the valve disc; and an annular spacer that is mounted on the outer circumference of the rod and sandwiches an inner circumference of the leaf valve together with the valve adjustment shim. The leaf valve may include: a first disc which has a communicating hole communicating with the port and is set to open outward; and an inwardly opening second disc which is annular and overlaps the first disc on the side close to the valve disc, opens and closes the communicating hole, and has a larger inner diameter than the first disc. According to the shock absorber configured in this manner, the valve adjustment shim functions not only for adjustment of the amount of initial deflection applied to the leaf valve but also as a stopper for restricting the movement of the valve disc, and thus, the two functions can be integrated into the valve adjustment shim, and the number of parts can be reduced to lower the cost. In addition, according to the shock absorber configured in this manner, the damping force when the liquid passes by opening the second disc is not increased and can be freely set even when the damping force when the liquid passes through the outer circumference of the leaf valve is reduced by opening the port with the first disc, and thus, it is possible to reduce the damping force on both the extension and compression sides.

In addition, the port in the shock absorber may have a first port provided for a flow of a liquid from one operation chamber to the other operation chamber and a second port provided for a flow of a liquid from the other operation chamber to the one operation chamber. The leaf valve may include a first leaf valve which is arranged on one end side of the valve disc in the axial direction and opens and closes the first port, and a second leaf valve which is arranged on another end side of the valve disc in the axial direction and opens and closes the second port. The valve disc may be biased from both the end sides in the axial direction by the first leaf valve and the second leaf valve. In the shock absorber configured in this manner, it is possible to suppress transmission of vibration to the rod at the time of switching from an extension operation to a contraction operation and at the time of switching from the contraction operation to the extension operation, and thus, it is possible to further suppress generation of the rattling noise and improve the ride comfort.

In addition, the shock absorber may include: a piston that is fixed to the outer circumference of the rod, has a main port causing the two operation chambers to communicate with each other, and is in sliding contact with an inner circumference of the cylinder; and a main leaf valve that is mounted on the outer circumference of the rod and opens and closes the main port. Furthermore, the shock absorber may allow movement of the valve disc in a radial direction with respect to the rod in sliding contact with the inner circumference of the cylinder. According to the shock absorber configured in this manner, sliding resistance does not increase and the extension and contraction can be smoothly performed even if the structure in which the piston and the valve disc are in sliding contact with the cylinder is adopted, and advanced dimensional control is unnecessary so that the cost is also lowered.

Advantageous Effects of Invention

As described above, it is possible to eliminate the rattling noise and improve the ride comfort in the vehicle according to the shock absorber of the present invention.

DESCRIPTION OF EMBODIMENTS

Figure 1:
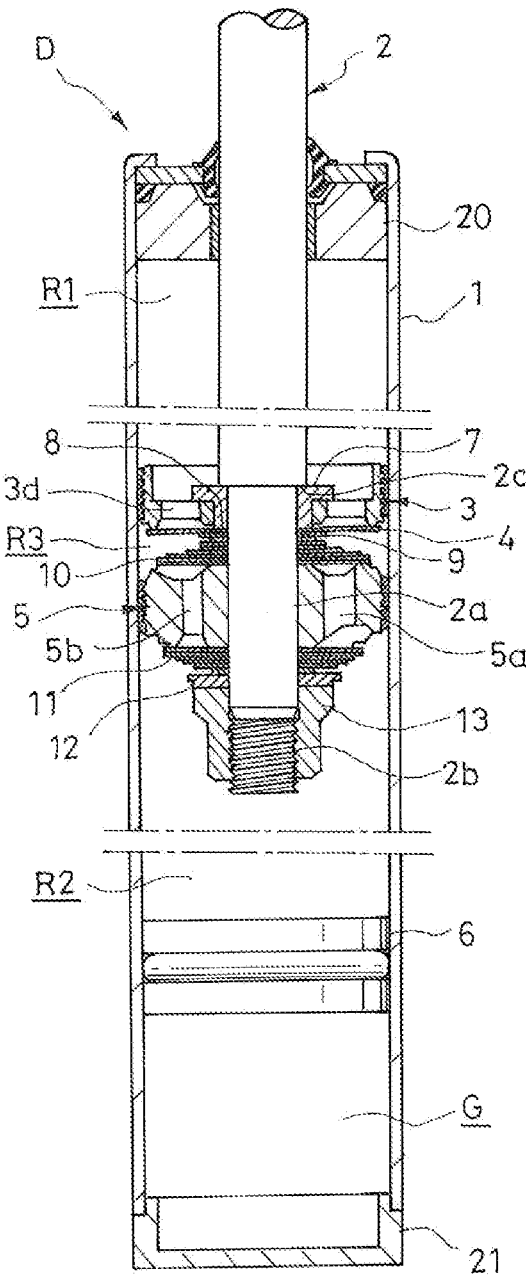
FIG. 1 is a longitudinal sectional view of a shock absorber according to an embodiment.
Figure 2:
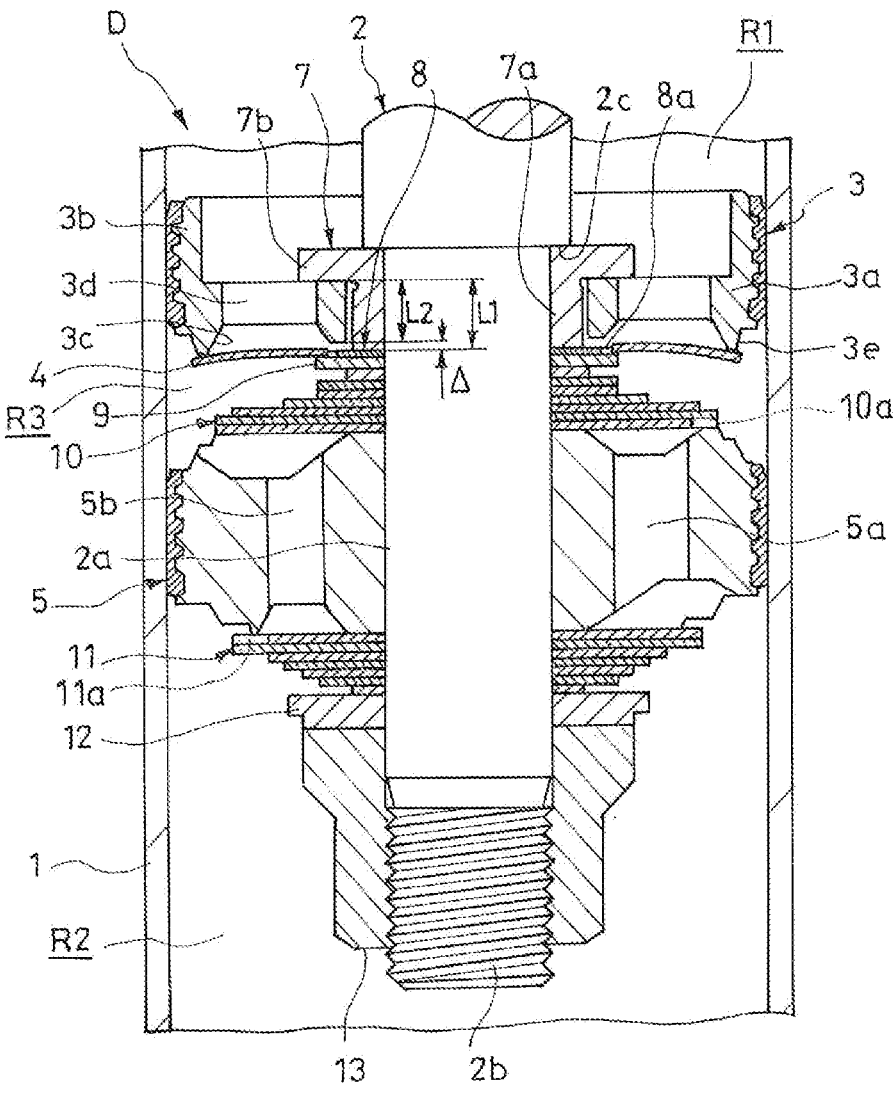
FIG. 2 is an enlarged sectional view of a piston portion of the shock absorber according to the embodiment.

The present invention will be described hereinafter on the basis of an embodiment illustrated in the drawings. As illustrated in FIGS. 1 and 2, a shock absorber D according to an embodiment includes: a cylinder 1; a rod 2 movably inserted into the cylinder 1; an extension side chamber R1 and a compression side chamber R2 as two operation chambers provided in the cylinder 1; a valve disc 3 having a port 3d that causes the extension side chamber R1 and the compression side chamber R2 to communicate with each other; and a leaf valve 4 that opens and closes the port 3d. Further, the shock absorber D is interposed between a vehicle body and an axle in a vehicle (not illustrated) and used to suppress vibration of the vehicle body and wheels.

Hereinafter, the respective parts of the shock absorber D will be described in detail. As illustrated in FIG. 1, an annular rod guide 20 is mounted on an upper end of the cylinder 1, and a lower end of the cylinder 1 is closed by a cap 21. Further, the rod 2 having a piston 5 and a valve disc 3 mounted on a distal end is movably inserted into cylinder 1.

The rod 2 is inserted through the rod guide to be slidable and inserted into the cylinder 1, and movement in the axial direction is guided by the rod guide 20. In addition, the inside of the cylinder 1 is partitioned into the extension side chamber R1 and the compression side chamber R2, which are filled with a liquid such as hydraulic oil, by the piston 5 and the valve disc 3. Note that a liquid other than the hydraulic oil such as water and an aqueous solution may also be used as the liquid.

Note that a gas chamber G is defined inside the cylinder 1 below the compression side chamber R2 by a free piston 6 slidably inserted into the cylinder 1. Further, when the rod 2 is displaced in the axial direction with respect to the cylinder 1, the free piston 6 is displaced in the axial direction with respect to the cylinder 1 to be expanded or contracted in the gas chamber G in response to a change of the volume of the rod 2 inside the cylinder 1, and the volume of the rod 2 moving in and out of the cylinder 1 is compensated by a change of the volume of the gas chamber G. In this manner, the shock absorber D is a so-called single cylinder type shock absorber, but may be configured as a double cylinder type shock absorber including a reservoir outside the cylinder 1.

Returning to the above, the rod 2 includes a small diameter portion 2a provided at the distal end which is a lower end in FIG. 1, a screw portion 2b provided on an outer circumference of a distal end of the small diameter portion 2a, and a stepped portion 2c formed by providing the small diameter portion 2a, and the annular piston 5 and the valve disc 3 are mounted on an outer circumference of the small diameter portion 2a.

The piston 5 is annular, is fixed to the outer circumference of the small diameter portion 2a, and has an outer circumference in sliding contact with an inner circumference of the cylinder 1. In addition, the piston 5 includes a compression side main port 5a and an extension side main port 5b as main ports. An outer circumference of the valve disc 3 is in sliding contact with the inner circumference of the cylinder 1, and includes the port 3d. Further, the piston 5 and the valve disc 3 cooperatively partition the inside of the cylinder 1 into the extension side chamber R1 and the compression side chamber R2, an intermediate chamber R3 is formed between the piston 5 and the valve disc 3. The intermediate chamber R3 communicates with the compression side chamber R2 through the compression side main port 5a and the extension side main port 5b provided in the piston 5, and communicates with the extension side chamber R1 through the port 3d provided in the valve disc 3. Thus, the compression side main port 5a, the extension side main port 5b, the intermediate chamber R3, and the port 3d form a passage that causes the extension side chamber R1 and the compression side chamber R2 to communicate with each other.

Further, a valve disc holder 7, a valve adjustment shim 8, an inner circumferential seat 9, a compression side main leaf valve 10 as a main leaf valve, the piston 5, an extension side main leaf valve 11 as the main leaf valve, and a valve stopper 12 are sequentially fitted to the outer circumference of the small diameter portion 2a of the rod 2 as illustrated in FIGS. 1 and 2. Further, the valve disc holder 7, the valve adjustment shim 8, the inner circumferential seat 9, the compression side main leaf valve 10, the piston 5, the extension side main leaf valve 11, and the valve stopper 12 are sandwiched and fixed by the stepped portion 2c of the rod 2 and a nut 13 screwed to the screw portion 2b.

In addition, the valve disc 3 is loosely fitted to an outer circumference of the valve disc holder 7 so as to be movable in the axial direction, and the leaf valve 4 is configured as an annular leaf valve of a double swing type in the present embodiment and is fitted to an outer circumference of the valve adjustment shim 8.

As illustrated in FIG. 2, the valve disc holder 7 includes a tubular portion 7a fitted to the outer circumference of the small diameter portion 2a of the rod 2, and a flange portion 7b provided on an outer circumference of an upper end of the tubular portion 7a in FIG. 2. In the present embodiment, the valve disc 3 includes: an annular main body portion 3a loosely fitted to an outer circumference of the tubular portion 7a of the valve disc holder 7; a sliding contact tube 3b that is provided on an outer circumference of the main body portion 3a and is in sliding contact with the inner circumference of the cylinder 1; an annular window 3c provided at an end on a side close to the leaf valve, which is a lower end in FIG. 2, of the main body portion 3a; and the port 3d that penetrates the main body portion 3a in the axial direction and communicates with the annular window 3c. In addition, an annular valve seat 3e is provided on an outer circumference of the annular window 3c at the lower end of the main body portion 3a of the valve disc 3 in FIG. 2. The annular valve seat 3e protrudes downward in FIG. 2 from the main body portion 3a, and an axial length from an upper end of the main body portion 3a in FIG. 2 to a lower end of the annular valve seat 3e in FIG. 2 is longer than an axial length L2 of the main body portion 3a on the inner circumferential side of the annular window 3c.

The axial length L2 of the main body portion 3a of the valve disc 3 on the inner circumference of the annular window 3c is shorter than an axial length L1 from a lower end of the tubular portion 7a of the valve disc holder 7 in FIG. 2 to a lower end of the flange portion 7b in FIG. 2, and the valve disc 3 can move on the outer circumference of the tubular portion 7a of the valve disc holder 7 in the axial direction by a difference A between the length L1 and the length L2. In this manner, the valve disc 3 is mounted on the rod 2 via the valve disc holder 7 in the present embodiment, but the valve disc holder 7 can be omitted if a stepped portion is provided on an outer circumference of the rod 2 in addition to the stepped portion 2c.

In addition, in the present embodiment, an inner circumferential diameter of the main body portion 3a of the valve disc 3 is larger than an outer circumferential diameter of the tubular portion 7a of the valve disc holder 7 and is smaller than an outer circumferential diameter of the flange portion 7b, and the valve disc 3 can be displaced in the radial direction with respect to the valve disc holder 7 by a difference between the inner circumferential diameter and the outer circumferential diameter without falling off from the valve disc holder 7. That is, the valve disc 3 can be displaced in the radial direction with respect to the rod 2, and the degree to which the displacement in the radial direction is allowed can be arbitrarily set on a condition that no problem occurs in generation of a damping force.

The valve adjustment shim 8 is annular, is fitted to the outer circumference of the small diameter portion 2a of the rod 2, and has a notch 8a on the outer circumference. Further, the valve adjustment shim 8 is fitted to the outer circumference of the rod 2 and has an outer diameter larger than an outer diameter of the tubular portion 7a of the valve disc 7. In addition, the valve adjustment shim 8 is stacked on the lower end of the tubular portion 7a of the valve disc holder 7 in FIG. 2, and faces the valve disc 3, loosely fitted to the outer circumference of the valve disc holder 7 in a state of abutting on the flange portion 7b, with a gap in the axial direction. Thus, when the valve disc 3 moves downward in FIG. 2 from the state illustrated in FIG. 2 and abuts on the valve adjustment shim 8, the valve adjustment shim 8 functions as a stopper that restricts further downward movement of the valve disc 3. In addition, the leaf valve 4 fitted to the outer circumference of the valve adjustment shim 8 is aligned by the valve adjustment shim 8, and is restricted from moving in the radial direction.

The inner circumferential seat 9 is annular and is fitted to the outer circumference of the small diameter portion 2a of the rod 2. An outer circumferential diameter of the inner circumferential seat 9 is larger than an outer circumferential diameter of the valve adjustment shim 8, and an inner circumference of a lower end of the leaf valve 4 in FIG. 2 is seated on an outer circumference of an upper end of the inner circumferential seat 9 in FIG. 2. An outer circumference of an upper end of the leaf valve 4 in FIG. 2 is seated on the annular valve seat 3e of the valve disc 3. As illustrated in FIG. 2, an axial position of the upper end of the inner circumferential seat 9 in FIG. 2 is higher in FIG. 2 than an axial position of the lower end of the annular valve seat 3e in a state where an upper end of the valve disc 3 abuts on the flange portion 7b of the valve disc holder 7. Thus, when the leaf valve 4 is interposed between the inner circumferential seat 9 and the annular valve seat 3e, the leaf valve 4 is seated on the inner circumferential seat 9 and the annular valve seat 3e in a deflected state due to initial deflection, and biases the valve disc 3 in a direction of abutting on the flange portion 7b. Note that the axial position of the upper end of the inner circumferential seat 9 in FIG. 2 on which the inner circumference of the leaf valve 4 is seated can be adjusted by the thickness, which is the length in the vertical direction in FIG. 2, of the valve adjustment shim 8 stacked on the lower end of the tubular portion 7a of the valve disc holder 7 in FIG. 2. Thus, the amount of the initial deflection, which is the magnitude of the initial deflection applied to the leaf valve 4, can be changed by changing a design of the thickness of the valve adjustment shim 8.

In addition, the leaf valve 4 closes the port 3d in the state of being seated on the inner circumferential seat 9 and the annular valve seat 3e, but is deflected upward on the inner circumferential side and is separated from the inner circumferential seat 9 to open the port 3d when the pressure of the intermediate chamber R3 becomes higher than the pressure of the extension side chamber R1, and is deflected downward on the outer circumferential side to be separated from the annular valve seat 3e and open the port 3d conversely when the pressure of the extension side chamber R1 becomes higher than the pressure of the intermediate chamber R3.

Note that a gap between the inner circumference of the leaf valve 4 and the outer circumference of the valve adjustment shim 8 may be made extremely small in order to reduce radial rattling of the leaf valve 4 when the leaf valve 4 is arranged on the outer circumference of the valve adjustment shim 8. However, in such a case, the area of a flow path formed by the gap when the inner circumference of the leaf valve 4 is separated from the inner circumferential seat 9 also decreases, and resistance applied to a flow of the liquid passing through the gap is sometimes excessive. On the other hand, when the notch 8a is provided on the outer circumference of the valve adjustment shim 8, the notch 8a contributes to the area of a flow path when the inner circumferential side of the leaf valve 4 is deflected and separated from the inner circumferential seat 9, and thus, the area of the flow path when the inner circumferential side of the leaf valve 4 is opened is ensured, and the resistance can be suppressed from becoming excessive. Therefore, it is possible to improve alignment performance of the leaf valve 4 by the valve adjustment shim 8 and to ensure the area of the flow path when the leaf valve 4 is opened by providing the notch 8a on the outer circumference of the valve adjustment shim 8. Note that the notch 8a can also be eliminated if the notch 8a is unnecessary.

Subsequently, the compression side main leaf valve 10 is a laminated leaf valve formed by laminating a plurality of annular plates, and overlaps an upper end of the piston 5 in FIG. 2 to open and close an outlet end of the compression side main port 5a. An orifice 10a formed by a notch is provided on an outer circumference of the annular plate of the compression side main leaf valve 10 facing the piston 5. Further, the compression side main leaf valve 10 causes the compression side chamber R2 and the intermediate chamber R3 to communicate with each other only through the orifice 10a in a state of being entirely in contact with the piston 5, and is deflected to open the compression side main port 5a if the pressure of the compression side chamber R2 received through the compression side main port 5a becomes higher than the pressure of the intermediate chamber R3 so that a differential pressure therebetween reaches a valve opening pressure.

The extension side main leaf valve 11 is a laminated leaf valve formed by laminating a plurality of annular plates, and overlaps the lower end of the piston 5 in FIG. 2 to open and close an outlet end of the extension side main port 5b. An orifice 11a formed by a notch is provided on an outer circumference of the annular plate of the extension side main leaf valve 11 facing the piston 5. Further, the extension side main leaf valve 11 causes the intermediate chamber R3 and the compression side chamber R2 to communicate with each other only through the orifice 11a in a state of being entirely in contact with the piston 5, and is deflected to open the extension side main port 5b if the pressure of the intermediate chamber R3 becomes higher than the pressure of the compression side chamber R2 through the extension side main port 5b and the differential pressure therebetween reaches the valve opening pressure.

The shock absorber D is configured as described above, and operations of the shock absorber D will be described hereinafter. First, an operation when the rod 2 moves upward in FIG. 1 with respect to the cylinder 1 and the shock absorber D performs an extension operation will be described. When the shock absorber D performs the extension operation, the piston 5 and the valve disc 3 move upward in FIG. 1 with respect to the cylinder 1, and thus, the extension side chamber R1 is compressed and the compression side chamber R2 is enlarged.

Then, the liquid inside the extension side chamber R1 moves to the compression side chamber R2. In a state where the extension speed of the shock absorber D is extremely low and the extension side main leaf valve 11 is not opened, the leaf valve 4 receives the pressure of the extension side chamber R1, is deflected on the outer circumferential side, and is separated from the annular valve seat 3e to open the port 3d. During the extension operation of the shock absorber D, the valve disc 3 is displaced downward in FIG. 2 with respect to the valve disc holder 7 by the pressure from the extension side chamber R1, but the amount of deflection of the outer circumference of the leaf valve 4 is larger than the amount of such displacement, and an annular gap is formed between the leaf valve 4 and the annular valve seat 3e to open the port 3d.

Thus, the liquid in the extension side chamber R1 deflects the outer circumference of the leaf valve 4, passes through the port 3d, passes through the intermediate chamber R3, passes through the main ports 5a and 5b on the compression side and the extension side and the orifices 10a and 11a, and moves to the compression side chamber R2. In this manner, when the extension speed of the shock absorber D falls within an extremely low speed range during the extension operation, a flow rate passing through the orifices 10a and 11a is very small, and thus, a pressure loss generated when the liquid passes through the leaf valve 4 is larger than a pressure loss generated when the liquid passes through the orifices 10a and 11a. Thus, the damping force is exerted mainly by the leaf valve 4 when the shock absorber D extends in the extremely low speed range.

In addition, when the extension speed of the shock absorber D falls within a low speed range, the extension side main leaf valve 11 is not opened, but the pressure loss in the orifices 10a and 11a increases, and thus, the shock absorber D exerts the damping force by the leaf valve 4 and the orifices 10a and 11a.

Furthermore, when the extension speed of the shock absorber D becomes high during the extension operation, the extension side main leaf valve 11 is deflected and opened to largely open the extension side main port 5*b*, and the shock absorber D exerts the damping force mainly by the leaf valve 4 and the extension side main leaf valve 11.

Next, an operation when the rod 2 moves downward in FIG. 1 with respect to the cylinder 1 and the shock absorber D performs a contraction operation will be described. When the shock absorber D performs the contraction operation, the piston 5 and the valve disc 3 move downward in FIG. 1 with respect to the cylinder 1, and thus, the compression side chamber R2 is compressed, and the extension side chamber R1 is enlarged.

Then, the liquid inside the compression side chamber R2 moves to the extension side chamber R1. In a state where the contraction speed of the shock absorber D is extremely low and the compression side main leaf valve 10 is not opened, the leaf valve 4 receives the pressure of the compression side chamber R2, and is deflected on inner circumferential side, and is separated from the inner circumferential seat 9, so that an annular gap is formed between the leaf valve 4 and the inner circumferential seat 9 to open the port 3*d*.

Thus, the liquid in the compression side chamber R2 passes through the main ports 5*a* and 5*b* on the compression side and the extension side, the orifices 10*a* and 11*a*, and the intermediate chamber R3, deflects the inner circumference of the leaf valve 4, passes through the port 3*d*, and moves to the extension side chamber R1. In this manner, when the contraction speed of the shock absorber D falls within an extremely low speed range during the contraction operation, a flow rate passing through the orifices 10*a* and 11*a* is very small, and thus, a pressure loss generated when the liquid passes through the leaf valve 4 is larger than a pressure loss generated when the liquid passes through the orifices 10*a* and 11*a*. Thus, the damping force is exerted mainly by the leaf valve 4 when the shock absorber D contracts in the extremely low speed range.

In addition, when the contraction speed of the shock absorber D falls within a low speed range, the compression side main leaf valve 10 is not opened, but the pressure loss in the orifices 10*a* and 11*a* increases, and thus, the shock absorber D exerts the damping force by the leaf valve 4 and the orifices 10*a* and 11*a*.

Furthermore, when the contraction speed of the shock absorber D becomes high during the contraction operation, the compression side main leaf valve 10 is deflected and opened to largely open the compression side main port 5*a*, and the shock absorber D exerts the damping force mainly by the leaf valve 4 and the compression side main leaf valve 10.

Note that a speed range in which the damping force is generated mainly by the leaf valve 4 is set as an extremely low speed, a speed range in which the damping force is generated mainly by the orifices 10*a* and 11*a* is set as a low speed, and a speed range in which the damping force is generated mainly by the compression side main leaf valve 10 or the extension side main leaf valve 11 is set as a high speed in the shock absorber D of the present embodiment as described above. Note that a designer can arbitrarily set the speed to be classified into the extremely low speed, the low speed, and the high speed. In addition, any one of the orifices 10*a* and 11*a* can be omitted, and the orifices 10*a* and 11*a* may be provided not in the compression side main leaf valve 10 and the extension side main leaf valve 11 but in the piston 5.

Meanwhile, when the shock absorber D repeats extension and contraction at the extremely low speed, the compression side main leaf valve 10 and the extension side main leaf valve 11 are not opened, and the leaf valve 4 opens and closes the port 3*d*. When the shock absorber D repeats extension and contraction at the extremely low speed in this manner and the shock absorber D switches from the extension operation to the contraction operation, the valve disc 3 is turned into a state of being separated from the flange portion 7*b* of the valve disc holder 7 by the action of the pressure of the extension side chamber R1 during the extension operation, and the outer circumference of the leaf valve 4 is deflected to be separated from the annular valve seat 3*e*. When an extension/contraction direction of the shock absorber D changes from this state to contraction, the leaf valve 4 receives the action of the compression side chamber R2 and returns to a position abutting on the annular valve seat 3*e* by its own restoring force, but an impact of a collision of the leaf valve 4 with the annular valve seat 3*e* is not transmitted to the rod 2 since the valve disc 3 is separated from the flange portion 7*b*.

In this manner, the impact generated when the leaf valve 4 separated from the annular valve seat 3*e* is seated on the annular valve seat 3*e* is not transmitted to the rod 2 in the shock absorber D of the present embodiment, and accordingly, vibration is not applied to the vehicle body.

In this manner, the shock absorber D according to the present embodiment includes: the cylinder 1; the rod 2 movably inserted into the cylinder 1; the extension side chamber (operation chamber) R1 and the compression side chamber (operation chamber) R2 provided in the cylinder 1; the valve disc 3 that is provided to be movable in the axial direction on the outer circumference of the rod 2 and has the annular valve seat 3*e* and the port 3*d* which is opened on the inner circumference of the annular valve seat 3*e* and causes the extension side chamber (operation chamber) R1 and the compression side chamber (operation chamber) R2 to communicate with each other; and the annular leaf valve 4 that opens and closes the port 3*d*. In the shock absorber D configured in this manner, the valve disc 3 can move in the axial direction with respect to the rod 2, and thus, it is possible to suppress transmission of the impact, generated when the leaf valve 4 is seated from the state of being separated from the annular valve seat 3*e*, to the rod 2 and to suppress the application of vibration to the vehicle body. Thus, it is possible to eliminate the rattling noise and improve the ride comfort in the vehicle since it is possible to suppress the application of vibration to the vehicle body according to the shock absorber D of the present embodiment.

In addition, in the shock absorber D of the present embodiment, the valve disc 3 is biased in the axial direction in the state where the leaf valve 4 is seated on the annular valve seat 3*e*, the valve disc 3 can be returned to the original position (position where the valve disc 3 abuts on the flange portion 7*b* of the valve disc holder 7) even if moving in a direction opposite to a biasing direction of the leaf valve 4, and there is no problem that the port 3*d* cannot be blocked but is left open regardless of the position of the valve disc 3. Thus, according to the shock absorber D configured in this manner, the damping force as set can be exerted even when the shock absorber expands or contracts at the extremely low speed, and there is no possibility that the damping force becomes insufficient to degrade the ride comfort.

Furthermore, in the shock absorber D of the present embodiment, the leaf valve 4 is annular and is configured as the double swing type leaf valve that is open on one of the inner side and the outer side with respect to the flow of the liquid from one operation chamber to the other operation chamber and is open on the other of the inner side and the outer side with respect to the flow of the liquid from the other operation chamber to the one operation chamber. Thus, the damping force on both the extension and contraction sides can be exerted by the single leaf valve 4, the total length of the piston portion can be shortened, and accordingly, the stroke length of the shock absorber D can be easily ensured. Note that the leaf valve 4 is open on the outer circumferential side with respect to the flow of the liquid from the extension side chamber R1 to the compression side chamber R2, and is open on the inner circumferential side with respect to the flow of the liquid from the compression side chamber R2 to the extension side chamber R1 in the present embodiment, but which of the inner circumference and the outer circumference of the leaf valve 4 is to be opened with respect to a direction of the flow can be arbitrarily changed in design. Note that the leaf valve 4 may be a laminated leaf valve formed by laminating a plurality of annular plates.

Note that the leaf valve 4 is arranged on a side of the valve disc 3 close to the intermediate chamber R3 in the lower part in FIG. 2 in the present embodiment, but may be arranged on a side of the valve disc 3 close to the extension side chamber R1 in the upper part in FIG. 2. In this case, the valve disc holder 7 may be arranged in a direction opposite to that illustrated in FIG. 2, and the valve adjustment shim 8 and the inner circumferential seat 9 may be arranged above the valve disc holder 7 in FIG. 2 together with the leaf valve 4.

In addition, the shock absorber D of the present embodiment includes the annular valve adjustment shim 8 that is mounted on the outer circumference of the rod 2, faces the valve disc 3 with the gap in the axial direction, and is arranged on the inner circumferential side of the leaf valve 4. According to the shock absorber D configured in this manner, the valve adjustment shim 8 functions not only for adjustment of the initial deflection amount applied to the leaf valve 4 but also as the stopper for restricting the movement of the valve disc 3, and thus, the two functions can be integrated into the valve adjustment shim 8, and the number of parts can be reduced to lower the cost.

Note that an opposing surface of the valve adjustment shim 8 that faces the valve disc 3 in the axial direction is an abutment surface that can abut on the valve disc 3. If a stepped portion is formed on the outer circumference of the valve adjustment shim 8 and the stepped portion is used as the abutment surface, a position of the abutment surface can be adjusted up and down in FIG. 2 by changing a design of the valve adjustment shim 8.

Furthermore, the shock absorber D of the present embodiment includes: the piston 5 that is fixed to the outer circumference of the rod 2, has the compression side main port 5*a* and the extension side main port 5*b* as the main ports causing the extension side chamber (operation chamber) R1 and the compression side chamber (operation chamber) R2 to communicate with each other, and is in sliding contact with the inner circumference of the cylinder 1; and the compression side main leaf valve 10 and the extension side main leaf valve 11 as the main leaf valves that are mounted on the outer circumference of the rod 2 and open and close the compression side main port 5*a* and the extension side main port 5*b*, and the valve disc 3 is in sliding contact with the inner circumference of the cylinder 1, and is also allowed to move in the radial direction with respect to the valve disc holder 7. According to the shock absorber D configured in this manner, the rod 2 and the cylinder 1 are positioned in the radial direction by the piston 5, but the valve disc 3 can move in the radial direction with respect to the rod 2, and thus, sliding resistance between the valve disc 3 and the cylinder 1 does not increase even if there is a dimensional error in the piston 5, the rod 2, or the valve disc 3. Thus, according to the shock absorber D configured in this manner, sliding resistance does not increase and the extension and contraction can be smoothly performed even if the structure in which the piston 5 and the valve disc 3 are in sliding contact with the cylinder 1 is adopted, and advanced dimensional control is unnecessary so that the cost is also lowered. Note that the valve disc 3 is not necessarily loosely fitted to but may be brought into sliding contact with the outer circumference of the valve disc holder 7 or the rod 2 as long as the dimension is accurately controlled even when the valve disc 3 is brought into sliding contact with the cylinder 1 or a guide tube 5*c* of the piston 5.

Figure 3:
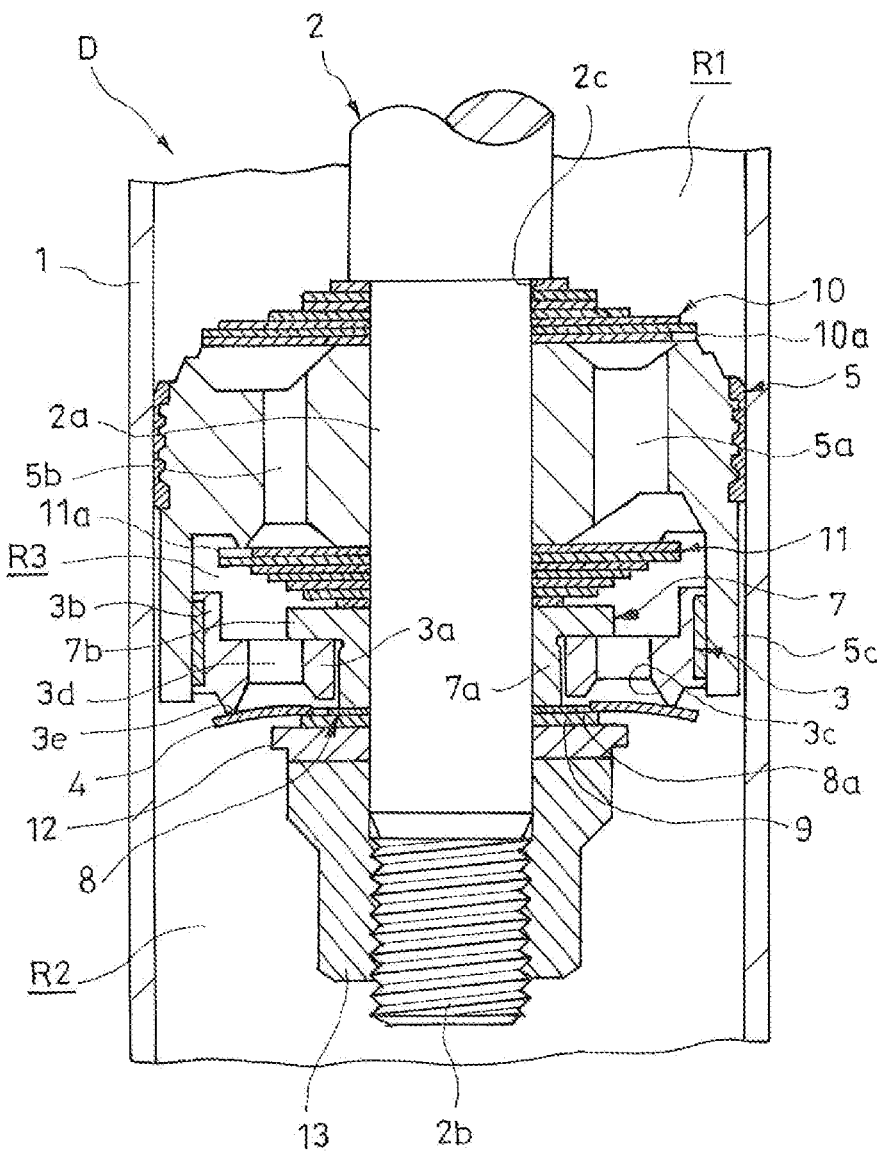
FIG. 3 is an enlarged sectional view of a piston portion of a shock absorber according to a first modification of the embodiment.

In addition, the valve disc 3 may be arranged on the lower side of the piston 5 and brought into sliding contact with an inner circumference of the guide tube 5*c* by providing the guide tube 5*c* protruding downward on an outer circumference of a lower end of the piston 5 in FIG. 3 without bringing the outer circumference of the valve disc 3 into sliding contact with the inner circumference of the cylinder 1 as in a first modification of the shock absorber D illustrated in FIG. 3. In this case, the valve disc holder 7, the valve adjustment shim 8, the leaf valve 4, and the inner circumferential seat 9 may be stacked below the extension side main leaf valve 11, and a space surrounded by the piston 5 and the valve disc 3 below the piston 5 in FIG. 3 may be used as the intermediate chamber R3. Note that the guide tube 5*c* may be a part separate from the piston 5.

Figure 4:
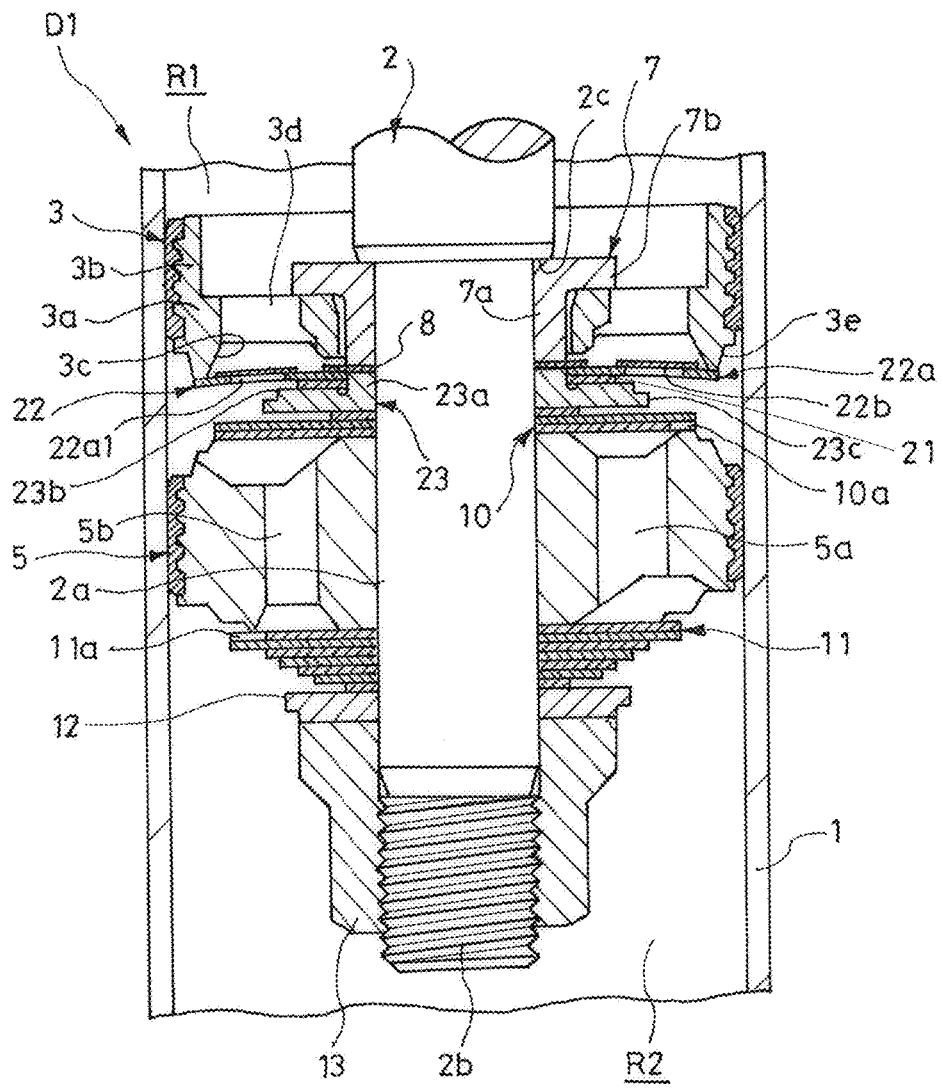
FIG. 4 is an enlarged sectional view of a piston portion of a shock absorber according to a second modification of the embodiment.

In addition, a spacer 21 arranged on a side opposite to the valve disc of the valve adjustment shim 8 may be provided on the outer circumference of the rod 2, and a leaf valve 22 may be sandwiched between the valve adjustment shim 8 and the spacer 21 as in a second modification of a shock absorber D1 illustrated in FIG. 4. Specifically, as illustrated in FIG. 4, the shock absorber D1 of the second modification includes a valve holder 23 and the spacer 21 supported by the valve holder 23, instead of the inner circumferential seat 9, and the leaf valve 22 having a first disc 22*a* and a second disc 22*b*, instead of the leaf valve 4, on the side opposite to the valve disc of the valve adjustment shim 8 in the structure of the shock absorber D illustrated in FIG. 2.

The valve holder 23 is annular, is fitted to the outer circumference of the rod 2 in a state of being stacked on the side opposite to the valve disc of the valve adjustment shim 8, has a shape whose outer diameter increases in two stages, and includes a small diameter portion 23*a*, a medium diameter portion 23*b*, and a large diameter portion 23*c* on an outer circumference from the valve disc side. Further, the leaf valve 22 and the spacer 21 are sequentially fitted to an outer circumference of the small diameter portion 23*a* of the valve holder 23.

When the valve holder 23 is stacked on the valve adjustment shim 8, an inner circumference of the first disc 22*a* in the leaf valve 22 arranged between the spacer 21 and the valve adjustment shim 8 is sandwiched between the valve adjustment shim 8 and the spacer 21. The valve holder 23 serves to adjust radial positions of the leaf valve 22 and the spacer 21, but the valve holder 23 may be eliminated when the inner circumferences of the spacer 21 and the leaf valve 22 are directly fitted to the outer circumference of the rod 2.

The leaf valve 22 includes: the first disc 22*a* that is annular, is fitted to the outer circumference of the small diameter portion 23a of the valve holder 23, has the inner circumference sandwiched between the valve adjustment shim 8 and the spacer 21, and is allowed to be deflected on the outer circumferential side; and the second disc 22b that is annular and is attached to a surface of the first disc 22a on the valve disc side.

The first disc 22a has an inner diameter smaller than outer diameters of the valve adjustment shim 8 and the spacer 21 and an outer diameter that is larger than the outer diameters of the valve adjustment shim 8 and the spacer 21 and is set to a diameter capable of being separated from and seated on the annular valve seat 3e of the valve disc 3, and is seated on the annular valve seat 3e with the inner circumference being sandwiched between the valve adjustment shim 8 and the spacer 21. When being deflected by receiving the pressure of the extension side chamber R1, the first disc 22a is separated from the annular valve seat 3e and opens the port 3d to apply resistance to the flow of the liquid from the extension side chamber R1 to the compression side chamber R2. In this manner, the first disc 22a can be separated from and seated on the annular valve seat 3e to open and close the port 3d. In addition, the first disc 22a includes a communicating hole 22a1 that penetrates the wall thickness thereof in the axial direction. Note that the valve holder 23 not only serves to adjust the radial positions of the leaf valve 22 and the spacer 21 but also functions as a valve stopper that supports the first disc 22a by causing an outer circumferential edge of the medium diameter portion 23b to abut on a surface of the first disc 22a on the side opposite to the valve disc when the first disc 22a is deflected to the maximum.

The second disc 22b is annular, has an inner diameter larger than the outer diameter of the valve adjustment shim 8, has an outer diameter smaller than the inner diameter of the annular valve seat 3e, is stacked on the surface of the first disc 22a on the valve disc side, and has an outer circumference attached to the outer circumferential side of the first disc 22a by welding or the like. In addition, the second disc 22b is attached at a position that closes the communicating hole 22a1 with respect to the first disc 22a, and closes the communicating hole 22a1 in a state of being entirely in contact with the first disc 22a, and is deflected upward in FIG. 4 on the inner circumferential side to open the communicating hole 22a1 when receiving the pressure of the intermediate chamber R3 through the communicating hole 22a1. That is, the second disc 22b is allowed to be deflected on the inner circumferential side with respect to the first disc 22a, and can open and close the communicating hole 22a1. Note that the second disc 22b opens the communicating hole 22a1 with respect to a flow from the compression side chamber R2 to the extension side chamber R1, which is an opposite direction of a flow of the liquid when the first disc 22a opens the port 3d, thereby applying resistance to the flow of the liquid.

In the shock absorber D1 configured in this manner, when the liquid flows from the extension side chamber R1 to the compression side chamber R2, the second disc 22b in the leaf valve 22 is pressed against the first disc 22a to close the communicating hole 22a1, whereas the first disc 22a is deflected on the outer circumference to open the port 3d. Thus, when the liquid flows from the extension side chamber R1 to the compression side chamber R2, the liquid passes through an annular gap formed between the first disc 22a and the annular valve seat 3e and moves from the extension side chamber R1 to the compression side chamber R2. The magnitude of resistance received when the liquid passes through the annular gap changes depending on a size of the annular gap, and the size of the annular gap changes depending on flexural rigidity of the first disc 22a and a diameter of the annular gap. The size of the annular gap increases as the diameter of the annular gap increases and as the flexural rigidity of the first disc 22a decreases.

Here, when it is desired to reduce a damping force when the port 3d is opened by the first disc 22a and the liquid passes through the outer circumference of the leaf valve 22, the outer diameter of the spacer 21, which serves as a fulcrum of the deflection of the first disc 22a, may be reduced as much as possible, and the inner diameter of the annular valve seat 3e may be increased as much as possible to increase the size of the annular gap between the annular valve seat 3e and the first disc 22a relative to the amount of deflection of the first disc 22a. Thus, the annular gap formed between the leaf valve 22 and the annular valve seat 3e when the shock absorber D1 contracts and the first disc 22a is deflected increases when the outer diameter of the spacer 21, which serves as the fulcrum of the deflection of the first disc 22a, is reduced as much as possible and the inner diameter of the annular valve seat 3e is increased as much as possible, and thus, the resistance applied to the flow of the liquid by the leaf valve 22 can be made extremely small.

On the other hand, when the liquid flows from the compression side chamber R2 to the extension side chamber R1 in the shock absorber D1 of the present embodiment, the first disc 22a of the leaf valve 22 is pressed against the annular valve seat 3e of the valve disc 3 to close the port 3d, whereas the second disc 22b receives the pressure of the compression side chamber R2 through the communicating hole 22a1, is deflected on the inner circumference to open the communicating hole 22a1 and cause the compression side chamber R2 and the port 3d to communicate with each other. In this manner, the second disc 22b applies the resistance to the flow of the liquid when the liquid flows from the compression side chamber R2 to the extension side chamber R1. The magnitude of a damping force when the liquid deflects the second disc 22b and passes through the communicating hole 22a1 is not related to the flexural rigidity of the first disc 22a, but depends on the size of the annular gap between the inner circumference of the second disc 22b and the first disc 22a when the inner circumference of the second disc 22b is deflected. Since a difference between the inner and outer circumferential diameters and the flexural rigidity of the second disc 22b can be set independently of the first disc 22a, the damping force when the liquid deflects the second disc 22b and passes through the communicating hole 22a1 can be set separately regardless of the setting of the first disc 22a. Further, the size of the annular gap between the inner circumference of the second disc 22b and the first disc 22a increases as the diameter of the annular gap increases and as the flexural rigidity of the second disc 22b decreases. Thus, when the inner circumferential diameter of the second disc 22b is increased to decrease the flexural rigidity of the second disc 22b, the annular gap, formed between the inner circumference of the second disc 22b and the first disc 22a when the shock absorber D contracts and the second disc 22b is deflected, becomes large, and thus, the resistance applied to the flow of the liquid by the leaf valve 22 can be made extremely small.

As the damping force when the liquid passes through the outer circumference of the leaf valve 22 is reduced by opening the port 3d with the first disc 22a in this manner, the damping force when the second disc 22b is opened to cause the passage of the liquid does not increase, and the damping force generated in the second disc 22b can be set relatively freely although there is some limitation depending on a position of the communicating hole 22a1 and the outer diameter of the first disc 22a.

In this manner, the shock absorber D1 according to the present embodiment includes the annular valve adjustment shim 8 that is mounted on the outer circumference of the rod 2, faces the valve disc 3 with the gap in the axial direction, and is arranged on the valve disc side of the leaf valve 22 and the annular spacer 21 that is mounted on the outer circumference of the rod 2 and sandwiches the inner circumference of the leaf valve 22 together with the valve adjustment shim 8. The leaf valve 22 includes: the first disc 22a which has the communicating hole 22a1 communicating with the port 3d and is set to open outward; and the inwardly opening second disc 22b which is annular and overlaps the first disc 22a on the valve disc side, opens and closes the communicating hole 22a1, and has a larger inner diameter than the first disc 22a.

In the shock absorber D1 configured in this manner, the valve adjustment shim 8 is mounted on the outer circumference of the rod 2 and faces the valve disc 3 with the gap in the axial direction. When the valve disc 3 moves downward in FIG. 2 to abut on the valve adjustment shim 8, the valve adjustment shim 8 functions the a stopper that restricts further downward movement of the valve disc 3. In addition, a fixing position on the inner circumferential side of the leaf valve 22 overlapping the side opposite to the valve disc of the valve adjustment shim 8 can be changed by changing the thickness of the valve adjustment shim 8. Thus, the amount of initial deflection, which is the magnitude of the initial deflection applied to the first disc 22a of the leaf valve 22, can be changed by changing a design of the thickness of the valve adjustment shim 8.

Therefore, according to the shock absorber D1 configured in this manner, the valve adjustment shim 8 functions not only for adjustment of the initial deflection amount applied to the leaf valve 22 but also as the stopper for restricting the movement of the valve disc 3, and thus, the two functions can be integrated into the valve adjustment shim 8, and the number of parts can be reduced to lower the cost.

Furthermore, according to the shock absorber D1 configured in this manner, the damping force when the liquid passes by opening the second disc 22b is not increased and can be freely set even when the damping force when the liquid passes through the outer circumference of the leaf valve 22 is reduced by opening the port 3d with the first disc 22a, and thus, it is possible to reduce the damping force on both the extension and compression sides. As described above, the damping force on both the compression side can be reduced according to the shock absorber D1 of the present embodiment.

In addition, according to the shock absorber D1 configured in this manner, the damping force when the liquid passes through the outer circumference of the leaf valve 22 by opening the port 3d can be adjusted by setting the flexural rigidity of the first disc 22a, the outer diameter of the spacer 21, and the outer diameter of the annular valve seat 3e, the damping force when the second disc 22b is opened to cause the passage of the liquid can be adjusted by setting the difference between the inner and outer diameters and the inner diameter of the second disc 22b, and the both can be independently adjusted so that the damping force on the extension side and the damping force on the compression side can be independently set. Note that a structure is formed in which the inner circumferences of the first disc 22a and the second disc 22b are supported by the spacer 21 and the both are deflected when the leaf valve 22 is opened by the pressure of the extension side chamber R1 in a case where the outer diameter of the spacer 21 is larger than the inner diameter of the second disc 22b. Even in this case, the damping force when the liquid passes through the outer circumference of the leaf valve 22 by opening the port 3d can be adjusted by setting the flexural rigidity of each of the first disc 22a and the second disc 22b, the outer diameter of the spacer 21, and the outer diameter of the annular valve seat 3e, the damping force when the second disc 22b is opened to cause the passage of the liquid can be adjusted by setting the difference between the inner and outer diameters and the inner diameter of the second disc 22b, so that the damping force on the extension side and the damping force on the compression side can be separately set.

Note that the outer diameter of the second disc 22b is smaller than the outer diameter of the first disc 22a in the leaf valve 22 described above, but the outer diameters of the first disc 22a and the second disc 22b may be set to be the same such that the second disc 22b is seated on the annular valve seat 3e. If the outer diameters of the first disc 22a and the second disc 22b are the same, the difference between the inner and outer diameters of the second disc 22b can be increased, which is advantageous for reducing the flexural rigidity, so that the damping force can be further reduced. In addition, the valve disc holder 7, the valve adjustment shim 8, the leaf valve 22, and the spacer 21 in the shock absorber D1 may be arranged in directions opposite to those illustrated in FIG. 4 such that the second disc 22b opens the communicating hole 22a1 with respect to the flow of the liquid from the extension side chamber R1 to the compression side chamber R2 and the first disc 22a opens the port 3d with respect to the opposite flow of the liquid from the compression side chamber R2 to the extension side chamber R1.

In addition, the leaf valve 22 has the structure in which the first disc 22a and the second disc 22b are stacked in FIG. 4, but the leaf valve 4 of FIG. 2 may be used instead of the leaf valve 22 of FIG. 4. In this case, a mode in which the leaf valve 4 is allowed to be deflected the outer circumference is formed since the inner circumference of the leaf valve 4 is sandwiched between the valve adjustment shim 8 and the spacer 21. Even in this case, the valve adjustment shim 8 functions as the stopper of the valve disc 3 and can exert the function of adjusting the amount of the initial deflection of the leaf valve 4. Note that an orifice or a choke may be provided in the leaf valve 4 or the annular valve seat 3e when it is desired to allow the liquid to move through the port 3d from the extension side chamber R1 to the compression side chamber R2 and from the compression side chamber R2 to the extension side chamber R1 in the case where the shock absorber is configured in this manner.

Subsequently, the double swing type leaf valve 4 is provided above or below the valve disc 3 in the shock absorber D of the present embodiment. However, leaf valves 4a and 4b on the extension side and the compression side may be provided above and below the valve disc 31, respectively, as in a shock absorber D2 of a third modification illustrated in FIG. 5.

Figure 5:
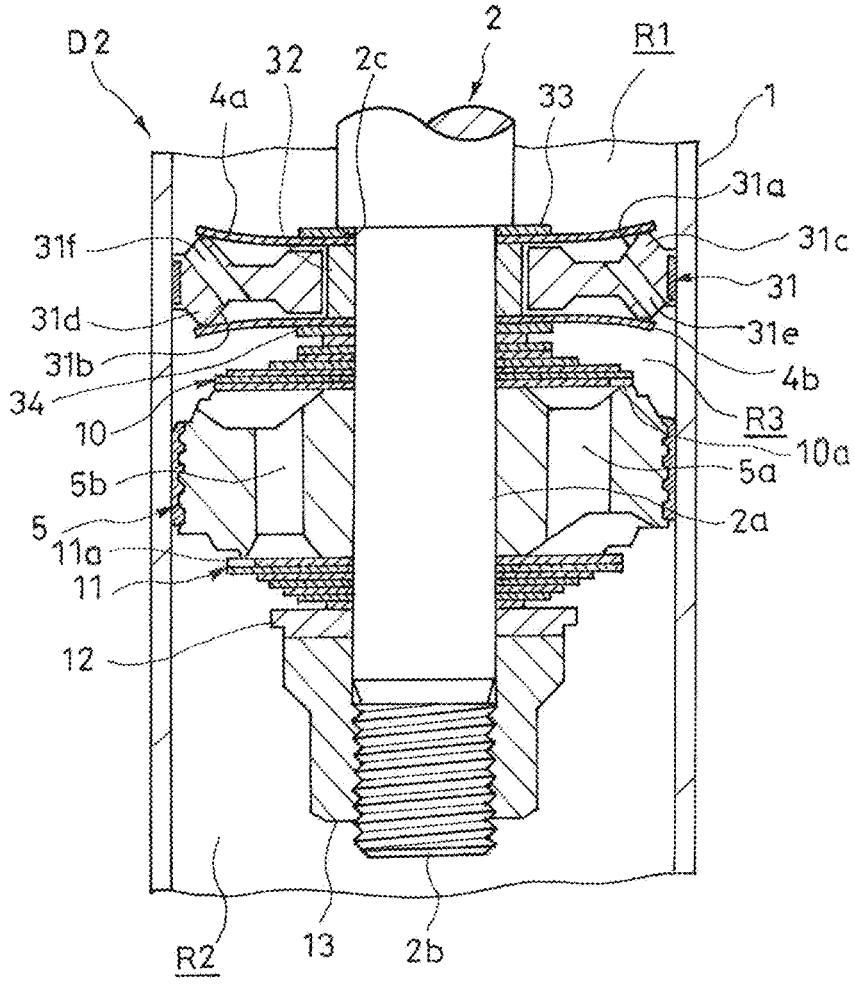
FIG. 5 is an enlarged sectional view of a piston portion of a shock absorber according to a third modification of the embodiment.

In this case, the valve disc 31 has a perforated disc shape, and includes: annular windows 31a and 31b provided at upper and lower ends in FIG. 5, respectively; annular valve seats 31c and 31d surrounding outer circumferences of the annular windows 31a and 31b, respectively; a first port 31e that opens from an outer circumference of the annular valve seat 31d at the lower end to communicate with the annular window 31a at the upper end; and a second port 31f that opens from an outer circumference of the annular valve seat 31c at the upper end to communicate with the annular window 31b at the lower end.

The valve disc 31 is loosely fitted to an outer circumference of a tubular collar 32 fitted to the outer circumference of the rod 2, and is allowed to move in the radial direction with respect to the rod 2. Further, the first leaf valve 4a having an inner circumference fixed to the rod 2 and a spacer 33 are stacked on the upper side of the collar 32 in FIG. 5, and the second leaf valve 4b having an inner circumference fixed to the rod 2 and a spacer 34 are also stacked on the lower side of the collar 32 in FIG. 5.

Further, below the spacer 33, the first leaf valve 4a, the collar 32, the valve disc 31, the second leaf valve 4b, and the spacer 34, the compression side main leaf valve 10, the piston 5, and the extension side main leaf valve 11 are stacked to be assembled with the outer circumference of the rod 2. The above-described respective parts combined in this manner are fixed to the small diameter portion 2a of the rod 2 by the nut 13.

Here, an axial length of the valve disc 31 on the inner circumferential side is shorter than an axial length of the collar 32, and the valve disc 31 can move in the axial direction with respect to the rod 2 similarly to the valve disc 3.

An outer circumference of the first leaf valve 4a is separated from and seated on the annular valve seat 31c of the valve disc 31 on the upper end side in FIG. 5 to open and close the first port 31e. An outer circumference of the second leaf valve 4b is separated from and seated on the annular valve seat 31d of the valve disc 31 on the lower end side in FIG. 5 to open and close the second port 31f. An axial length of the valve disc 31 from an upper end of the annular valve seat 31c to a lower end of the annular valve seat 31d is longer than the axial length of the collar 32. When the first leaf valve 4a is seated on the annular valve seat 31c and the second leaf valve 4b is seated on the annular valve seat 31d, the first leaf valve 4a and the second leaf valve 4b are deflected to bias the valve disc 31 from above and below. In this manner, initial deflection is applied to the first leaf valve 4a and the second leaf valve 4b, and thus, the valve disc 31 is biased by both the first leaf valve 4a and the second leaf valve 4b, and is positioned at a position where biasing forces of the both are balanced.

When the shock absorber D2 according to the third modification of the embodiment configured in this manner extends at the extremely low speed, the second leaf valve 4b is deflected, the valve disc 31 moves downward in FIG. 5 by the action of the pressure of the extension side chamber R1, and the second leaf valve 4b is separated from the annular valve seat 31d to open the second port 31f. Thus, the liquid in the extension side chamber R1 moves to the compression side chamber R2 through the second port 31f, and the second port 31f allows only a flow of the liquid from the extension side chamber R1 to the compression side chamber R2. Further, the shock absorber D2 according to the third modification generates a damping force using the second leaf valve 4b when extending at the extremely low speed. Similarly to the shock absorber D, the shock absorber D2 according to the third modification generates the damping force using the second leaf valve 4b and the orifices 10a and 11a when extending at the low speed, and generates the damping force mainly using the extension side main leaf valve 11 when extending at the high speed.

On the other hand, when the shock absorber D2 according to the third modification of the embodiment contracts at an extremely low speed, the first leaf valve 4a is deflected, the valve disc 31 moves upward in FIG. 5 by the action of the pressure of the compression side chamber R2, and the first leaf valve 4a is separated from the annular valve seat 31d to open the first port 31e. Thus, the liquid in the compression side chamber R2 moves to the extension side chamber R1 through the first port 31e, and the first port 31e allows only a flow of the liquid from the compression side chamber R2 to the extension side chamber R1. Further, the shock absorber D2 according to the third modification generates the damping force using the first leaf valve 4a when contracting at the extremely low speed. Similarly to the shock absorber D, the shock absorber D2 according to the third modification generates the damping force using the first leaf valve 4a and the orifices 10a and 11a when contracting at a low speed, and generates the damping force mainly using the compression side main leaf valve 10 when extending at a high speed.

Further, when the shock absorber D2 repeats extension and contraction at the extremely low speed, the compression side main leaf valve 10 and the extension side main leaf valve 11 are not opened, and the first leaf valve 4a and the second leaf valve 4b open and close the corresponding first port 31e and second port 31f. In this manner, when the shock absorber D2 repeats extension and contraction at the extremely low speed and the shock absorber D is switched from the extension operation to the contraction operation, the valve disc 31 moves downward in FIG. 5 by the action of the pressure of the extension side chamber R1 during the extension operation, and the outer circumference of the second leaf valve 4b is deflected and separated from the annular valve seat 31d. When an extension/contraction direction of the shock absorber D2 changes from this state to contraction, the second leaf valve 4b receives the action of the compression side chamber R2 and returns to a position abutting on the annular valve seat 31d by its own restoring force, but an impact of a collision of the second leaf valve 4b with the annular valve seat 31d is not transmitted to the rod 2 since the valve disc 31 is separated from the inner circumference of the first leaf valve 4a.

In addition, when the shock absorber D2 repeats extension and contraction at the extremely low speed and the shock absorber D switches from the contraction operation to the extension operation, the valve disc 31 moves upward in FIG. 5 by the action of the pressure of the compression side chamber R2 during the contraction operation, and the outer circumference of the first leaf valve 4a is deflected and separated from the annular valve seat 31c. When the extension/contraction direction of the shock absorber D2 is changed from this state to extension, the first leaf valve 4a receives the action of the extension side chamber R1 and returns to a position abutting on the annular valve seat 31c by its own restoring force, but an impact of a collision of the first leaf valve 4a with the annular valve seat 31c is not transmitted to the rod 2 since the valve disc 31 is separated from the inner circumference of the second leaf valve 4b.

In this manner, the impact, generated when the first leaf valve 4a or the second leaf valve 4b separated from the annular valve seat 31c or 31d is seated on the annular valve seat 31c or 31d, is not transmitted to the rod 2 in the shock absorber D2 of the present embodiment, and accordingly, vibration is not applied to the vehicle body.

In the shock absorber D2 according to the third modification of the embodiment configured in this manner, the port provided in the valve disc 31 includes: the first port 31e provided for the flow of the liquid from one compression side chamber (operation chamber) R2 to the other extension side chamber (operation chamber) R1; and the second port 31f provided for the flow of the liquid from the other extension side chamber (operation chamber) R1 to the one compression side chamber (operation chamber) R2. The leaf valve includes: the first leaf valve 4a that is arranged on the upper end side in FIG. 5, which is one end side in the axial direction of the valve disc 31, and opens and closes the first port 31e; and the second leaf valve 4b that is arranged on the lower end side in FIG. 5, which is the other end side in the axial direction of the valve disc 31, and opens and closes the second port 31f. The valve disc 31 is biased by the first leaf valve 4a and the second leaf valve 4b from the upper and lower sides in FIG. 5, which are both the end sides in the axial direction.

In the shock absorber D2 configured in this manner, the valve disc 31 can move in the axial direction with respect to the rod 2. Thus, it is possible to suppress transmission of the impact, generated when the first leaf valve 4a and the second leaf valve 4b are seated from the state of being separated from the corresponding annular valve seat 31c and annular valve seat 31d, to the rod 2, and to suppress the application of vibration to the vehicle body. That is, in the shock absorber D2 according to the third modification, it is possible to suppress transmission of vibration to the rod 2 at the time of switching from the extension operation to the contraction operation and at the time of switching from the contraction operation to the extension operation, and thus, it is possible to further suppress generation of the rattling noise and improve the ride comfort.

In addition, in the shock absorber D2 according to the present embodiment, the first leaf valve 4a and the second leaf valve 4b bias the valve disc 31 from both the sides in the axial direction. Thus, the valve disc can be returned to the original position (position where the biasing forces of the first leaf valve 4a and the second leaf valve 4b are balanced) even if the valve disc 31 moves in the axial direction, and there is no problem that the first port 31e and the second port 31f cannot be blocked but are left open regardless of the position of the valve disc 31. Thus, according to the shock absorber D2 configured in this manner, the damping force as set can be exerted even when the shock absorber expands or contracts at the extremely low speed, and there is no possibility that the damping force becomes insufficient to degrade the ride comfort.

Furthermore, in the shock absorber D2 according to the third modification, the damping force is generated by the second leaf valve 4b during the extension operation at the extremely low speed, and the damping force is generated by the first leaf valve 4a during the contraction operation at the extremely low speed. Thus, the damping force during the extension operation and the damping force during the contraction operation can be set separately and independently.

Although the preferred embodiment of the present invention has been described above in detail, modifications, variations, and changes are possible without departing from the scope of the claims.

REFERENCE SIGNS LIST 1 cylinder
2 rod
3, 31 valve disc
4, 22 leaf valve
3d port
3e, 31c, 31d annular valve seat
4a first leaf valve
4b second leaf valve
5 piston
5a compression side main port (main port)

5b extension side main port (main port)
8 valve adjustment shim
9 inner circumferential seat
10 compression side main leaf valve (main leaf valve)
11 extension side main leaf valve (main leaf valve)
21 spacer
22a first disc
22a1 communicating hole
22b second disc
b31e first port
31f second port
D, D1, D2 shock absorber
R1 extension side chamber (operation chamber)
R2 compression side chamber (operation chamber)

The invention claimed is:

1. A shock absorber comprising:
a cylinder;
a rod movably inserted into the cylinder;
two operation chambers provided in the cylinder;
a valve disc that is provided to be movable in an axial direction on an outer circumference of the rod and has an annular valve seat and a port which is opened on an inner circumference of the annular valve seat and causes the two operation chambers to communicate with each other;
an annular leaf valve that opens and closes the port; and
an annular valve adjustment shim that is mounted on the outer circumference of the rod, faces a leaf valve side end of the valve disc with a gap in the axial direction, and is arranged on an inner circumferential side of the leaf valve,
wherein, when the valve disc moves in the axial direction on the outer circumference of the rod and abuts on the valve adjustment shim, the valve adjustment shim functions as a stopper that restricts further movement of the valve disc, and
the leaf valve is a double swing type leaf valve which is interposed between an annular inner circumferential seat provided on the rod and the annular valve seat.

2. The shock absorber according to claim 1, wherein the leaf valve biases the valve disc in the axial direction in a state of being seated on the annular valve seat.

3. The shock absorber according to claim 1, further comprising:
a piston that is fixed to the outer circumference of the rod, has a main port causing the two operation chambers to communicate with each other, and is in sliding contact with an inner circumference of the cylinder; and
a main leaf valve that is mounted on the outer circumference of the rod and opens and closes the main port.

4. A shock absorber comprising:
a cylinder;
a rod movably inserted into the cylinder;
two operation chambers provided in the cylinder;
a valve disc that is provided to be movable in an axial direction on an outer circumference of the rod and has an annular valve seat and a port which is opened on an inner circumference of the annular valve seat and causes the two operation chambers to communicate with each other;
an annular leaf valve that opens and closes the port; and
an annular valve adjustment shim that is mounted on the outer circumference of the rod, faces the valve disc with a gap in the axial direction, and abuts against a valve disc side of the leaf valve,
wherein, when the valve disc moves in the axial direction on the outer circumference of the rod and abuts on the valve adjustment shim, the valve adjustment shim functions as a stopper that restricts further movement of the valve disc.

5. The shock absorber according to claim 4, wherein the leaf valve biases the valve disc in the axial direction in a state of being seated on the annular valve seat.

6. The shock absorber according to claim 4, wherein the leaf valve is a double swing type leaf valve which is interposed between an annular inner circumferential seat provided on the rod and the annular valve seat.

7. The shock absorber according to claim 4, further comprising:
a piston that is fixed to the outer circumference of the rod, has a main port causing the two operation chambers to communicate with each other, and is in sliding contact with an inner circumference of the cylinder; and
a main leaf valve that is mounted on the outer circumference of the rod and opens and closes the main port.

8. The shock absorber according to claim 4, wherein the valve disc is in sliding contact with an inner circumference of the cylinder and is allowed to move in a radial direction with respect to the rod.

9. A shock absorber comprising:
a cylinder;
a rod movably inserted into the cylinder;
two operation chambers provided in the cylinder;
a valve disc that is provided to be movable in an axial direction on an outer circumference of the rod and has an annular valve seat and a port which is opened on an inner circumference of the annular valve seat and causes the two operation chambers to communicate with each other;
an annular leaf valve that opens and closes the port;
an annular valve adjustment shim that is mounted on the outer circumference of the rod, faces the valve disc with a gap in the axial direction, and is arranged on the leaf valve on a side close to the valve disc; and
an annular spacer that is mounted on the outer circumference of the rod and sandwiches an inner circumference of the leaf valve together with the valve adjustment shim,
wherein the leaf valve includes:
   a first disc which has a communicating hole communicating with the port and is set to open outward; and
   an inwardly opening second disc which is annular and overlaps the first disc on the side close to the valve disc, opens and closes the communicating hole, and has a larger inner diameter than the first disc.

10. The shock absorber according to claim 9, wherein the leaf valve biases the valve disc in the axial direction in a state of being seated on the annular valve seat.

11. The shock absorber according to claim 9, wherein the leaf valve is a double swing type leaf valve which is interposed between an annular inner circumferential seat provided on the rod and the annular valve seat.

12. The shock absorber according to claim 9, further comprising:
a piston that is fixed to the outer circumference of the rod, has a main port causing the two operation chambers to communicate with each other, and is in sliding contact with an inner circumference of the cylinder; and
a main leaf valve that is mounted on the outer circumference of the rod and opens and closes the main port.

13. The shock absorber according to claim 9, wherein the valve disc is in sliding contact with an inner circumference of the cylinder and is allowed to move in a radial direction with respect to the rod.

14. A shock absorber comprising:
a cylinder;
a rod movably inserted into the cylinder;
two operation chambers provided in the cylinder;
a valve disc that is provided to be movable in an axial direction on an outer circumference of the rod and has an annular valve seat and a port which is opened on an inner circumference of the annular valve seat and causes the two operation chambers to communicate with each other; and
an annular leaf valve that opens and closes the port,
wherein the port includes a first port provided for a flow of a liquid from one of the two operation chambers to another and a second port provided for a flow of a liquid from the other of the two operation chambers to the one,
the leaf valve includes a first leaf valve which is arranged on one end side of the valve disc in the axial direction and opens and closes the first port, and a second leaf valve which is arranged on another end side of the valve disc in the axial direction and opens and closes the second port,
the first leaf valve and the second leaf valve are seated on the annular valve seat in an initial deflected state, and bias the valve disc from both the end sides in the axial direction, and
the leaf valve biases the valve disc in the axial direction in a state of being seated on the annular valve seat.

15. The shock absorber according to claim 14, further comprising:
a piston that is fixed to the outer circumference of the rod, has a main port causing the two operation chambers to communicate with each other, and is in sliding contact with an inner circumference of the cylinder; and
a main leaf valve that is mounted on the outer circumference of the rod and opens and closes the main port.

16. The shock absorber according to claim 14, wherein the valve disc is in sliding contact with an inner circumference of the cylinder and is allowed to move in a radial direction with respect to the rod.

17. A shock absorber comprising:
a cylinder;
a rod movably inserted into the cylinder;
two operation chambers provided in the cylinder;
a valve disc that is provided to be movable in an axial direction on an outer circumference of the rod and has an annular valve seat and a port which is opened on an inner circumference of the annular valve seat and causes the two operation chambers to communicate with each other;
an annular leaf valve that opens and closes the port; and
an annular valve adjustment shim that is mounted on the outer circumference of the rod, faces a leaf valve side end of the valve disc with a gap in the axial direction, and is arranged on an inner circumferential side of the leaf valve,
wherein, when the valve disc moves in the axial direction on the outer circumference of the rod and abuts on the valve adjustment shim, the valve adjustment shim functions as a stopper that restricts further movement of the valve disc, and
the valve disc is in sliding contact with an inner circumference of the cylinder and is allowed to move in a radial direction with respect to the rod.

18. The shock absorber according to claim 17, wherein the leaf valve biases the valve disc in the axial direction in a state of being seated on the annular valve seat.

19. The shock absorber according to claim 17, wherein the leaf valve is a double swing type leaf valve which is interposed between an annular inner circumferential seat provided on the rod and the annular valve seat.

20. The shock absorber according to claim 17, further comprising:

a piston that is fixed to the outer circumference of the rod, has a main port causing the two operation chambers to communicate with each other, and is in sliding contact with an inner circumference of the cylinder; and a main leaf valve that is mounted on the outer circumference of the rod and opens and closes the main port.

* * * * *